Patented July 10, 1934

1,966,228

UNITED STATES PATENT OFFICE 1,966,228

MILK TREATMENT

Joseph Willmann, Derby, Conn.

No Drawing. Application June 30, 1931,
Serial No. 547,834

7 Claims. (Cl. 99—11)

In the treatment of milk on a large scale for distribution in cities it is customary to run the product through a centrifugal filter or clarifier for the purpose of removing foreign matter which inevitably finds its way into the milk at the farms and dairies where it is produced and stored in cans for transportation to plants for pasteurization and bottling. The foreign matter is thrown against the outer wall of the centrifuging chamber and is removed at recurrent intervals by disassembling and washing certain of the parts. The centrifuge is sometimes so constructed that it also separates the cream from the milk; while some of the cream is sold as such, most of it is again mixed with the "skimmed milk" for sale as "whole milk" and it is common practice to direct the cream and skimmed milk into the same receptacle as it issues from the separator.

I have discovered that the usual centrifugal treatment has a deleterious effect on the product in at least two respects, viz: it renders the milk more difficult to pasteurize and it also impairs the "creaming quality", that is, it produces some physical changes in the product which reduce the proportion of cream which will rise to the top after remixing, so that the cream line in the bottled product is reduced thereby falsely giving customers an unfavorable opinion as to the cream content. Moreover, in cases where customers desire to remove the cream for separate use the proportion which can be skimmed off is correspondingly reduced. While the aforesaid change in the constitution of the milk and/or cream produced by the centrifuge is obscure it is believed to involve changes in the "binder" constituents such as casein, albumen and milk sugar and also in the size and/or composition of the butter-fat particles. I have also discovered that these deleterious effects are produced to some extent by prolonged agitation of whole milk such as ordinarily occurs in the transportation of milk in large cans by truck or rail from farms and dairies to bottling plants.

Objects of the present invention are to avoid the aforesaid deleterious effects without sacrificing any of the advantages of centrifugal cleaning and transportation in large receptacles such as cans holding several gallons or tank cars or trucks, to improve the flavor of whole milk and cream respectively, to increase the effectiveness of pasteurization, to increase the amount of cream which can be "skimmed" from whole milk, and generally to improve the art of milk treatment and transportation.

The invention involves, in addition to the foregoing, the further discoveries: first, that if the milk and cream components separated by a centrifuge be aged and/or chilled before remixing, said deleterious effects are largely reduced and, secondly, that if the milk and cream components are transported separately, even in large containers normally permitting substantial agitation, said effects of transportation are substantially avoided, presumably due to the fact that cream is too thick to permit substantial splashing or rapid agitation, even in a partly filled can or tank, during transportation by truck or rail, and that skimmed milk is unaffected by such action. The aging effect results from keeping the cream constituents separated from the milk constituents until the former change in composition so that when remixed the cream constituents do not recombine with the milk constituents in the same intimate relationship as in the original whole milk. When the aging is effected during transportation several hours are ordinarily available for this stage of the process but if the cream constituents be chilled during the aging stage pronounced improvement in creaming quality and flavor of the remixed product is obtained in a much shorter period.

According to this invention the preferred procedure is to separate the milk and cream components at the farm or dairy, preferably at a low temperature such as 40° to 50° F., the concentration of the cream preferably being of the order of forty percent, ship the components in separate cans or tanks by truck and/or rail to the bottling plants, and there remix the components and bottle the resulting product. In this way the aforesaid aging may take place during transportation without any loss of time, although somewhat better results are attained by further aging at reduced temperature at the bottling plant, particularly where the haul from farms or dairy to bottling plant is short. In cases where the milk is bottled at the dairy the components may be remixed as soon as they are chilled or, if refrigeration is not available, after the components have stood for a longer time. However, best results are obtained by aging at reduced temperature (e. g. 40° to 50° F.) for a prolonged period of time, for example thirty minutes to several hours, depending upon the degree of perfection desired. If the product is to be pasteurized, the heat treatment is preferably applied after remixing.

Thus it will be evident that my new method requires no apparatus other than that ordinarily employed and, when the milk must be transported a considerable distance to the bottling plant as is usually the case, it does not require more time. It will also be understood that in the remixing step it is immaterial whether the milk and cream components come from the same source; that is, the same improved results are obtained if the cream from one source is remixed with milk from another source. Moreover the process permits ready control of the proportion of cream in the remixed product.

My improved process not only increases the creaming quality and flavor of milk but it also aids in the pasteurization process since the latter is more effective if performed after foreign matter, including air bubbles, has been removed by centrifugal action.

It should be understood that the present disclosure is for the purpose of illustration only and that this invention includes all modifications and equivalents which fall within the scope of the appended claims.

I claim:

1. The method of handling milk involving the removal of foreign matter by centrifugal action with concomitant separation of the cream and milk components, and the subsequent remixing of such components for distribution as whole milk, characterized by aging the cream component before remixing.

2. The method of treating milk which comprises removing foreign matter, separating the cream, aging the cream, remixing the milk and cream and subsequently pasteurizing the mixture.

3. The method of treating milk which comprises removing foreign matter, separating the cream, chilling the milk and cream components, subsequently remixing the milk and cream and subsequently pasteurizing the mixture.

4. The method of handling milk involving the removal of foreign matter by centrifugal action with concomitant separation of the cream and milk components, and the subsequent remixing of such components for distribution as whole milk, characterized by aging the components at a reduced temperature before remixing.

5. The method of handling milk involving transportation in large containers normally permitting prolonged agitation in transit, the removal of foreign matter by centrifugal action with concomitant separation of the milk and cream components, and the subsequent remixing of the components for distribution as whole milk, characterized in that the separation is effected before said transportation and the remixing after said transportation.

6. The method of handling milk involving the removal of foreign matter by centrifugal action with concomitant separation of the cream and milk components, and the subsequent remixing of such components for distribution as whole milk, characterized by aging the cream component before remixing and pasteurizing after remixing.

7. The method of handling milk involving the removal of foreign matter by centrifugal action with concomitant separation of the cream and milk components, and the subsequent remixing of such components for distribution as whole milk, characterized by chilling the cream component before remixing.

JOSEPH WILLMANN.